United States Patent [19]

Huang

[11] Patent Number: 5,741,854
[45] Date of Patent: Apr. 21, 1998

[54] VINYL AROMATIC RESIN COMPOSITIONS CONTAINING A FLUORO OLEFIN POLYMER AND A METAL SALT OR ESTER OR A FATTY ACID

[75] Inventor: Jianing Huang, Parkersburg, W. Va.

[73] Assignee: General Electric Company, Pittsfield, Mass.

[21] Appl. No.: 690,058

[22] Filed: Jul. 31, 1996

Related U.S. Application Data

[63] Continuation of Ser. No. 342,545, Nov. 21, 1994, abandoned.

[51] Int. Cl.[6] .................................................. C08G 63/48
[52] U.S. Cl. ........................... 525/72; 525/178; 525/199
[58] Field of Search ................................. 525/72, 178, 199

[56] References Cited

U.S. PATENT DOCUMENTS 3,294,871 12/1966 Schmitt et al. ........................... 525/199
3,671,487 6/1972 Abolins .
3,723,373 3/1973 Lucas .
3,758,640 9/1973 Thorpe ..................................... 525/63
3,838,092 9/1974 Vogt et al. .
4,016,139 4/1977 Anderson et al. .
4,107,232 8/1978 Haaf et al. .
4,579,906 4/1986 Zabrocki et al. .

FOREIGN PATENT DOCUMENTS 63-118217 5/1988 Japan .

Primary Examiner—Jeffrey T. Smith

[57] ABSTRACT

A thermoplastic resin composition is provided exhibiting enhanced levels of dart impact strength. The composition contains a vinyl aromatic resin, an increased tetrafluoroethylene polymer and a reduced level of metal salt of a fatty acid. The tetrafluoroethylene polymer is introduced into the composition in the form of a preblend of tetrafluoroethylene polymeric powder and a carrier material. The compositions are useful for making molded articles such as business machine housings. A method for making the composition is also provided.

16 Claims, No Drawings

VINYL AROMATIC RESIN COMPOSITIONS CONTAINING A FLUORO OLEFIN POLYMER AND A METAL SALT OR ESTER OR A FATTY ACID

This is a continuation of application Ser. No. 08/342,545 filed on Nov. 21, 1994, now abandoned.

BACKGROUND OF THE INVENTION

1. Field of the Invention

The present invention relates to vinyl aromatic resin compositions, and more particularly relates to vinyl aromatic resin compositions containing a tetrafluoroethylene polymer.

2. Description of the Related Art

Vinyl aromatic resin compositions, specifically, vinyl aromatic-vinyl cyanide-diene rubber graft copolymers are generally known, but have needed amount of lubricants such as metal salts of fatty acids in order to facilitate injection molding and mold release thereof. Additionally, various flame retardants such as brominated, chlorinated and phosphate containing materials have been added to such compositions to enhance their flame retardancy, and drip suppressants such as tetrafluoroethylene polymers have been added there to suppress drip formation upon exposure of the flame retarded compositions to flame. Such additives have, however, typically and undesirably reduced the dart impact strength, specifically the Gardner dart impact strength of such compositions.

Consequently, there is a need and desire to provide vinyl aromatic compositions containing a metal salt of a fatty acid and a tetrafluoroethlene wherein the composition exhibits a relatively high dart impact strength.

SUMMARY OF THE INVENTION

A thermoplastic resin composition is provided comprising (a) a vinyl aromatic polymer present at a level of from 60 to 99.8 percent by weight based on the total weight of said composition, (b) a metal salt of a fatty acid present at a level of from 0.1 to 0.9 percent by weight based on the total weight of the composition, (c) a tetrafluoroethylene polymer present at a level of from 0.03 to 0.8 percent by weight based on the total weight of the composition, said tetrafluoroethylene polymer being introduced into said composition in the form of a preblend comprising from 0.5 to 50 percent by weight tetrafluoroethylene polymer based on the total weight of the preblend and comprising from 50 to 99.5 percent by weight of a polymeric carrier material based on the total weight of the preblend. A method is also provided comprising (a) making a preblend by blending a tetrafluoroethylene polymeric powder with an organic carrier material, the preblend comprising the tetrafluoroethylene polymeric powder at a level of from 0.5 percent by weight to 50 percent by weight based on the total weight of the preblend, (b) admixing the preblend with a vinyl aromatic resin and a metal salt of a fatty acid to form the composition, the metal salt of a fatty acid being present at a level of from 0.1 to 0.9 percent by weight based on the total weight of the composition. The thermoplastic resin is useful for making molded articles such as business machine housings and automotive parts exhibiting enhanced dart impact strength. It may also be suitable to replace the metal salt of a fatty acid with an ester of a fatty acid at the above levels.

DETAILED DESCRIPTION OF THE INVENTION

The thermoplastic resin composition comprising (a) a vinyl aromatic polymer, preferably a vinyl aromatic-vinyl cyanide-diene rubber graft copolymer, present at a level of from 60 to 99.8 percent by weight based on the total weight of the composition, more preferably from 80 to 99.5 percent by weight thereof, and most preferably from 99 to 99.2 percent by weight thereof; (b) a metal salt of a fatty acid, preferably magnesium stearate, present at a level of from 0.1 to 0.9 percent by weight based on the total weight of the composition, more preferably from 0.4 to 0.6 percent by weight thereof, most preferably from 0.45 to 0.5 percent by weight thereof; and (c) a tetrafluoroethylene polymer present at a level of from 0.03 to 0.8 percent by weight based on the total weight of the composition, more preferably from 0.04 to 0.5 percent by weight thereof, and most preferably from 0.05 to 0.2 percent by weight thereof. A critical aspect of the present invention is that the tetrafluoroethylene polymer be introduced into the composition in the form of a preblend wherein the preblend preferably comprises from 0.5 to 50 percent by weight tetrafluoroethylene polymer based on the total weight of the preblend, more preferably from 1 to 25 percent by weight thereof, and most preferably from 5 to 20 percent by weight thereof; and preferably comprises a carrier material at a level of from 50 to 99.5 percent by weight based on the total weight of the preblend, more preferably from 75 to 99 percent by weight thereof, and most preferably from 80 to 95 percent by weight thereof. It may also be suitable to replace the metal salt of a fatty acid with an ester of a fatty acid at the above levels.

The vinyl aromatic resin is preferably a rubber modified monovinylidene aromatic resin comprising (a) a rubber modified monovinylidene aromatic graft copolymer and (b) an ungrafted rigid copolymer, are generally prepared by graft polymerization of a mixture of a monovinylidene aromatic monomer and one or more comonomers in the presence of one or more rubbery polymeric substrates. Depending on the amount of rubber present, a separate matrix or continuous rigid phase of ungrafted rigid (co) polymer may be simultaneously obtained along with the rubber modified monovinylidene aromatic graft polymer. The resins may also be produced by blending a rigid monovinylidene aromatic copolymer with one or more rubber modified monovinylidene aromatic graft copolymers. Typically, the rubber modified resins comprise the rubber modified graft copolymer at a level of from 5 to 100 percent by weight based on the total weight of the resin, more preferably from 10 to 95 percent by weight thereof, more preferably 20 to 90 percent by weight thereof, and most preferably from 15 to 85 percent by weight thereof; and the rubber modified resin comprises the ungrafted rigid polymer at a level of from 0 to 95 percent by weight based on the total weight of the resin, more preferably from 5 to 90 percent by weight thereof, more preferably from 10 to 80 percent by weight thereof and most preferably from 15 to 85 percent by weight thereof.

Monovinylidene aromatic monomers (vinyl aromatic monomers) which may be employed include styrene, alpha-methyl styrene, halostyrenes i.e. dibromostyrene, mono or di alkyl, alkoxy or hydroxy substitute groups on the nuclear ring of the monovinylidene aromatic monomer i.e. vinyl toluene, vinylxylene, butylstyrene, para-hydroxystyrene or methoxystyrene or mixtures thereof. The monovinylidene-aromatic monomers utilized are generically described by the following formula:

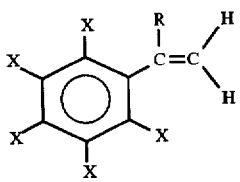

wherein X is selected from the group consisting of hydrogen, alkyl groups of 1 to 5 carbon atoms, cycloalkyl, aryl, alkaryl, aralkyl, alkoxy, aryloxy, and halogens. R is selected from the group consisting of hydrogen, alkyl groups of 1 to 5 carbon atoms and halogens such as bromine and chlorine. Examples of substituted vinyl aromatic compounds include styrene, 4-methylstyrene, 3,5-diethylstyrene, 4-n-propylstyrene, α-methylstyrene, α-methyl vinyltoluene, α-chlorostyrene, α-bromostyrene, dichlorostyrene, dibromostyrene, tetrachlorostyrene, mixtures thereof and the like. The preferred monovinylidene aromatic monomers used are styrene and/or α-methylstyrene.

Comonomers which may be used with the monovinylidene aromatic monomer includes acrylonitrile, methacrylonitrile, $C_1$ to $C_8$ alkyl or aryl substituted acrylate, $C_1$ to $C_8$ alkyl, aryl or haloaryl substituted methacrylate, acrylic acid, methacrylic acid, itaconic acid, acrylamide, N-substituted acrylamide or methacrylamide, maleic anhydride, maleimide, N-alkyl, aryl or haloaryl substituted maleimide, glycidyl (meth)acrylates, hydroxy alkyl (meth) acrylates or mixtures thereof. The acrylonitrile, substituted acrylonitrile, or acrylic acid esters are described generically by the following formula:

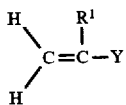

wherein $R^1$ may be selected from the same group set out for R as previously defined and Y is selected from the group consisting of cyano and carbalkoxy groups wherein the alkoxy group of the carbalkoxy contains from one or about twelve carbon atoms. Examples of such monomers include acrylonitrile, ethacrylonitrile, methacrylonitrile, α-chloroacrylonitrile, α-bromoacrylonitrile, methyl acrylate, methyl methacrylate, ethyl acrylate, butyl acrylate, propylacrylate, isopropyl acrylate and mixtures thereof. The preferred monomer is acrylonitrile and the preferred acrylic acid esters are ethyl acrylate and methyl methacrylate. It is also preferred that the acrylic acid esters, when included, are employed in combination with styrene or acrylonitrile.

The rubber modified graft copolymer comprises (i) the rubber substrate, and (ii) a rigid polymeric superstrate portion grafted to the rubber substrate. The rubber substrate is preferably present in the graft copolymer at a level of from 5 to 85 percent by weight based on the total weight of the graft copolymer, more preferably from 10 to 80 percent by weight thereof, and most preferably 20 to 70 percent by weight thereof; and the rigid superstrate is preferably present at a level of from 15 to 95 percent by weight based on the total weight of the graft copolymer, more preferably from 20 to 90 percent by weight thereof, and most preferably from 30 to 80 percent by weight thereof.

For high rubber graft emulsion resins, the rubber level will range from 50 to 85% by weight based on the total weight of the rubber modified resin. For mass polymerization, the rubber level ranges from 4 to 40% by weight based on the total weight of the rubber modified resin. For blends of an ungrafted rigid copolymer (such as styrene-acrylonitrile copolymer) with an emulsion high rubber graft (HRG) copolymer (such as acrylonitrile-butadiene-styrene graft copolymers), the rubber loading will typically range from 10 to 40% rubber based on the total weight of the rubber modified resin.

Examples of rubbery polymers for the substrate include: conjugated dienes, copolymers of a diene with styrene, acrylonitrile, methacrylonitrile or $C_1$ to $C_8$ alkyl acrylate which contain at least 50% (preferably at least 65% by weight) conjugated dienes, polyisoprene or mixtures thereof; olefin rubbers i.e. ethylene propylene copolymer (EPR) or ethylene propylene non-conjugated diene (EPDM); silicone rubbers; or $C_1$ or $C_8$ alkyl acrylate homopolymers or copolymers with butadiene and/or styrene. The acrylic polymer may also contain up to 5% of one or more polyfunctional crosslinking agents such as alkylenediol di(meth)acrylates, alkylenetriol tri(meth)acrylates, polyester di(meth)acrylates, divinylbenzene, trivinylbenzene, butadiene, isoprene and optionally graftable monomers such as, triallyl cyanurate, triallyl isocyanurate, allyl (meth)acrylate, diallyl maleate, diallyl fumarate, diallyl adipate, triallyl esters of citric acid or mixtures of these agents.

The diene rubbers may preferably be polybutadiene, polyisoprene and copolymers of butadiene with up to 35% by weight of comonomers such as styrene, acrylonitrile, methmethacrylate or $C_1$–$C_6$-alkylacrylate which are produced by aqueous radical emulsion polymerization. The acrylate rubbers may be cross-linked, particulate emulsion copolymers substantially of $C_1$–$C_8$-alkylacrylate, in particular $C_2$–$C_6$-alkylacrylate, optionally in admixture with up to 15% by weight of comonomers such as styrene, methylmethacrylate, butadiene, vinyl methyl ether or acrylonitrile and optionally up to 5% by weight of a polyfunctional crosslinking comonomer, e.g. divinylbenzene, glycol-bis-acrylates,bisacrylamides, phosphoric acid triallylester, citric acid triallylester, allylesters of acrylic acid or methacrylic acid, triallylcyanurate, triallylisocyanurate. Also suitable are mixtures of diene- and alkylacrylate rubbers and rubbers which have a so-called core/sheath structure, e.g. a core of diene rubber and a sheath of acrylate or vice versa.

Specific conjugated diene monomers normally utilized in preparing the rubber substrate of the graft polymer are generically described by the following formula:

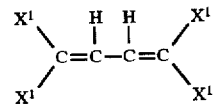

wherein $X^1$ is selected from the group consisting of hydrogen, alkyl groups containing from one to five carbon atoms, chlorine or bromine. Examples of dienes that may be used are butadiene, isoprene, 1,3-heptadiene, methyl-1,3-pentadiene, 2,3-dimethylbutadiene, 2-ethyl-1,3-pentadiene 1,3- and 2,4-hexadienes, chloro and bromo substituted butadienes such as dichlorobutadiene, bromobutadiene, dibromobutadiene, mixtures thereof, and the like. A preferred conjugated diene is 1,3 butadiene.

The substrate polymer, as mentioned, is preferably a conjugated diene polymer such as polybutadiene, polyisoprene, or a copolymer, such as butadiene-styrene, butadiene-acrylonitrile, or the like. The rubbery polymeric substrate portion must exhibit a glass transition temperature (Tg) of less than about 0° C.

Mixtures of one or more rubbery polymers previously described for preparing the monovinylidene aromatic graft polymers, or mixtures of one or more rubber modified monovinylidene aromatic graft polymers disclosed herein may also be employed. Furthermore, the rubber may comprise either a block or random copolymer. The rubber particle size used in this invention as measured by simple light transmission methods or capillary hydrodynamic chromatography (CHDF) may be described as having an average particle size by weight of select one of the following: 0.05 to 1.2 microns, preferably 0.2 to 0.8 microns, for emulsion based polymerized rubber latices or 0.5 to 10 microns, preferably 0.6 to 1.5 microns, for mass polymerized rubber substrates which also have included grafted monomer occlusions. The rubber substrate is preferably a particulate, highly crosslinked diene or alkyl acrylate rubber, and preferably has a gel content greater than 70%.

Preferred graft superstrates include copolymers of styrene and acrylonitrile, copolymers of α-methylstyrene and acrylonitrile and methylmethacrylate polymers or copolymers with up to 50% by weight of $C_1$-$C_6$ alkylacrylates, acrylonitrile or styrene. Specific examples of monovinylidene aromatic graft copolymers include but are not limited to the following: acrylonitrile-butadiene-styrene (ABS), acrylonitrile-styrene-butyl acrylate (ASA), methylmethacrylate-acrylonitrile-butadiene-styrene (MABS), acrylonitrile-ethylene-propylene-non-conjugated diene-styrene (AES).

The ungrafted rigid polymers (typically free of rubber) are resinous, thermoplastic polymers of styrene, α-methylstyrene, styrenes substituted in the nucleus such as p-methylstyrene, methyl acrylate, methylmethacrylate, acrylonitrile.methacrylonitrile, maleic acid anhydride, N-substituted maleimide, vinyl acetate or mixtures thereof. Styrene/acrylonitrile copolymers, α-methylstyrene/ acrylonitrile copolymers and methylmethacrylate/ acrylonitrile copolymers are preferred.

The ungrafted rigid copolymers are known and may be prepared by radical polymerization, in particular by emulsion, suspension, solution or bulk polymerization. They preferably have number average molecular weights of from 20,000 to 200,000.

The number average molecular weight of the grafted rigid superstrate of the monovinylidene aromatic resin is designed to be in the range of 20,000 to 350,000. The ratio of monovinylidene aromatic monomer to the second and optionally third monomer may range from 90/10 to 50/50 preferably 80/20 to 60/40. The third monomer may optional replace 0 to 50% of one or both of the first and second monomers.

These rubber modified monovinylidene aromatic graft polymers may be polymerized either by mass, emulsion, suspension, solution or combined processes such as bulk-suspension, emulsion-bulk, bulk-solution or other techniques well known in the art. Furthermore, these rubber modified monovinylidene aromatic graft copolymers may be produced either by continuous, semibatch or batch processes.

The thermoplastic resin may also contain amounts of a second resin such as an aromatic polycarbonate resin, a polybutylene terephthalate resin or a polyphenylene ether resin. The vinyl aromatic resin may also be a polystyrene or a rubber modified polystyrene.

Tetrafluoroethylene polymers which are suitable according to the invention have fluorine contents of 65–76% by weight, preferably 70–76% by weight. Examples are polytetrafluoroethylene, tetrafluoroethylene/ hexafluoropropylene copolymers and tetrafluoroethylene copolymers containing small amounts of fluorine-free copolymerisable ethylenically unsaturated monomers. Such polymers are known from "Vinyl and Related Polymers", John Wiley & Sons, Inc., New York, 1952, pages 484–494; "Fluorpolymers", Wiley-Interscience, New York, 1972; "Encyclopedia of Polymer Science and Technology", Interscience Publishers, New York, Volume 13, 1970, pages 623–654; "Modern Plastics Encyclopedia", 1970–1971, Volume 47, No. 10 A, October 1970 McGraw-Hill, Inc., New York, pages 134, 138 and 774; "Modern Plastics Encyclopedia", 1975–1976, October 1975, Volume 52, No. 10 A, McGraw-Hill, Inc., New York, pages 27, 28 and 472 and U.S. Pat. Nos. 3,671,487, 3,723,373 and 3,838,092. The tetrafluoroethylene polymers of the present invention are in powder or latex form.

Suitable metal salts of fatty acids include magnesium salts, calcium salts, zinc salts and titanium salts. The preferred salts are magnesium salts of fatty acids such as magnesium stearate. Suitable metal salts of fatty acids may be represented by the general formula

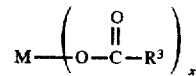

wherein x is the valance of the metal atom and $R^3$ is selected from $C_3$ to $C_{21}$ alkyl groups and preferably is selected from $C_{11}$ to $C_{17}$ alkyl groups, and is more preferably a $C_{17}$ alkyl group. Preferably M is magnesium or calcium. It may be suitable to replace the metal salt of a fatty acid with an ester of a fatty acid. Esters of fatty acids may be made by suitable means such as reacting an alcohol (mono, di or polyol) with a fatty acid, and suitable esters may be represented by the formula:

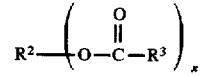

wherein $R^3$ and x are as defined above, and $R^2$ is a straight or branched alkyl radical having a valence of x, and preferably is a $C_1$ to $C_{10}$ alkyl radical, and is more preferably a neoalkyl. Most preferably the ester of fatty acid is an ester of stearic acid, and is most preferably pentaerythritol tetrastearate.

Optionally the composition may contain or be free of the usual flameproofing additives, in particular low molecular weight bromine compounds, can be used as the organic halogen compounds. Examples are octabromodiphenyl ethers, tetrabromophthalimide, tribromophenoxymethane, bis(tribromophenoxy)ethane, tris(tribromophenyl) triphosphate, trichlorotetrabromotoluene, hexabromocyclododecane and decabromodiphenyl ether. Mono or poly oligomer of tetrabromo BP-A either capped with tri to penta bromo phenol or uncapped are also suitable.

The thermoplastic composition may contain or be free of various other components such as flame retardant synergists (enhancing agents) such as oxides and halides of groups IV-A and V-A of the periodic table; organic or inorganic compounds of phosphorous, nitrogen, boron or sulfur; and oxides and halides of, for example, zinc, magnesium and titanium, all as disclosed in U.S. Pat. No. 4,016,139. Preferred enhancing agents in accordance with this invention are the oxides of antimony, arsenic and bismuth, with the oxides of antimony being especially preferred. Suitable synergists include $Sb_2O_3$ (antimony trioxide), $Sb_2(CO_3)_3$, $Bi_2O_3$ and $Bi_2(CO_3)_3$, and may be present in various amounts such as 0 to 15% by weight based on the total weight of the flame retardant thermoplastic composition more preferably from 0.1 to 15%, even more preferably 2 to 10%, and most preferably 3 to 6 percent by weight thereof.

The polymeric carrier material is preferably a vinyl aromatic polymer, and is more preferably a vinyl aromatic-vinyl cyanide copolymer, and is most preferably a styrene-acrylonitrile copolymer.

The scope of the present invention includes the incorporation of other additives in the composition so far as to produce a particular end result. Such additives include, without limitation, heat stabilizers, light stabilizers, plasticizers, pigments, preservatives, ultraviolet light stabilizers, fillers, antioxidants, antistatic agents and other materials well known to those skilled in the art, for example, as described in Modern Plastics Encyclopedia, Vol. 63, No. 10A, McGraw-Hill, Inc. (1986).

EXAMPLES

ABS-1 is an acrylonitrile-styrene-diene butadiene rubber graft copolymer.

MgSt is a magnesium stearate.

PTFE is Polytetrafluoroethylene.

10 PTFE/SAN is a preblend of 10% by weight PTFE powder and 90% by weight styrene-acrylonitrile copolymer. 20% PTFE co-coagulation is 20 weight percent PTFE and 80 weight percent ABS-1 formed by coagulation of latexes.

Preblend-2 is a preblend containing amounts of lubricant and resin and 0.2 parts by weight PTFE.

EBS Wax (N,N'-ethylene bis(stearamide)) is a commercially available lubricant.

Pluronic F-88 is a commercially available block copolymer of ethylene oxide and propylene oxide and typically used as a release agent.

TABLE 1

|  | A | B | C | D | E | F |
|---|---|---|---|---|---|---|
| ABS-1 | 100 → | → | → | → | → | → |
| MgSt | 2 → | → | → | → | → | → |
| PTFE Powder |  | 0.2 |  |  |  |  |
| 10 PTFE/SAN |  |  | 0.5 | 1.0 | 2.0 |  |
| 20% PTFE co-coagulation |  |  |  |  |  | 1.0 |
| Dynatup |  |  |  |  |  |  |
| M.F.E. (ft-lb) | 9.33 | 14.05 | 13.86 | 12.55 | 19.74 | 19.46 |
| St. Dev. | 5.53 | 6.95 | 5.37 | 6.23 | 7.88 | 4.44 |
| Izod impact (ft-lb/in) | 5.9 | 6.5 | 6.6 | 6.5 | 6.5 | 6.9 |
| Dynatup rechek | 12.66 | 10.99 | 11.76 | 11.81 | 18.35 | 17.43 |

TABLE 2

|  | G | H | 1 | 2 | I |
|---|---|---|---|---|---|
| ABS-1 | 100 | 100 | 100 | 100 | 96 |
| PTFE Powder |  | 0.4 |  |  |  |
| 20% PTFE co-coagulation |  |  | 2.0 |  |  |
| 10 PTFE/SAN |  |  |  | 4.0 |  |
| Preblend- 2 |  |  |  |  | 6.2 |
| MgSt |  | 0.5 | 0.5 | 0.5 | 0.5 |
| Gardner Dart Impact |  |  |  |  |  |
| M.F.E. | 21 | 9.4 | >26 | >26 | 15.73 |
| Izod impact (ft-lb/in) | 5.0 | 6.9 | 8.0 | 7.5 | 6.8 |

TABLE 2-continued

|  | G | H | 1 | 2 | I |
|---|---|---|---|---|---|
| Dynatup |  |  |  |  |  |
| M.F.E. (ft-lb) | 37.62 |  | 34.08 | 32.94 |  |
| St. Dev. | 1.68 |  | 4.13 | 3.57 |  |

TABLE 3

|  | 3 | 4 |
|---|---|---|
| SAN | 49.9 | 49.9 |
| ABS-2 | 50.1 | 46.1 |
| TBBPA | 13 | 13 |
| Br-Epoxy | 12 | 12 |
| Antimony Oxide | 6 | 6 |
| Pluronic F-88 | 0.5 |  |
| MgStearate | 0.25 |  |
| EBS Wax | 0.5 |  |
| Silicone Oil | 0.1 | 0.1 |
| 10%PTFE/E-SAN | 2.0 |  |
| Preblend-3 |  | 5.45 |
| Gardner Dart Impact |  |  |
| M.F.E. (ft-lb) | >26 | >26 |
| Izod Impact (ft-lb/in) | 3.9 | 4.4 |
| UL94 Flame Test |  |  |
| 0.050 abt/mbt | 1.0/1.0 | 1.0/1.0 |
| Mold shrinkage ASTM955* (in./in.) | 0.0042 | 0.0041 |

Preblend 3 is a masterbatch prepared using the following formulation in parts by weight

| ABS-2 | 4 part |
|---|---|
| EBS wax | 0.5 part |
| Mgstearate | 0.25 part |
| Pluronic F-88 | 0.5 part |
| PTFE | 0.2 part |

TABLE 4

|  | J | K | 5 |
|---|---|---|---|
| ABS-1 resin | 96 | 96 | 100 |
| FR-1 | 20 | 20 | 20 |
| Sb2O3 | 5 | 5 | 5 |
| 0.05 PTFE/lube* | 6.05 |  |  |
| 0.2 CD-1/lube** |  | 6.2 |  |
| 10% PTFE/E-SAN |  |  | 2.0 |
| MgSt |  |  | 0.5 |
| Gardner Dart Impact |  |  |  |
| M.F.E. (ft-lb) | 9.67 | 5.00 | 22.33 |
| St. Dev. | 5.13 | 4.05 | 1.71 |
| Izod Impact (ft-lb/in.) | 2.9 | 2.9 | 2.9 |
| UL94 flame test |  |  |  |
| @.060" mbt/abt rating | 1.0/1.0 V-O | 1.0/1.0 V-O | 1.0/1.0 V-O |
| 5-V flame test @.125" @.125" bars rating | 5-V | 5-V | 5-V |
| @.125" 4 × 6 plaque rating | 5-VA | 5VA | 5VA |

FR-1 is decabromodiphenyl ether.
* 0.05 PTFE/Lube is a masterbatch made from 4 parts of ABS-1 resin, 2 parts MgSt and 0.05 parts of PTFE in parts by weight.
** 0.2 CD-1/Lube is a masterbatch made from 4 parts of ABS-1 resin, 2 parts MgSt and 0.2 parts of PTFE in parts by weight.

TABLE 5

|  | 6 | 7 | 8 | 9 | 10 | 11 |
|---|---|---|---|---|---|---|
| ABS-1 | 100 → | → | → | → | → | → |
| FR-1 | 20 → | → | → | → | → | → |
| SB203 | 5 → | → | → | → | → | → |
| MgSt | 0.5 → | → | → | → | → | → |
| 10% PTFE/E-SAN |  | 0.5 | 1.0 | 1.5 | 2.0 | 4.0 |
| Compounding: Banbury start at 125 RPM until reflux, then raise to 200 RPM, drop at 360° F., Molding stock temp. 450° F., | | | | | | |
| Gardner Dart Impact | | | | | | |
| M.F.E. (ft-lb) | >26 | >26 | >26 | >26 | >26 | >26 |
| Izod Impact (ft-lb/in.) | 2.9 | 2.6 | 2.6 | 2.6 | 2.6 | 2.5 |
| UL94 V-O flame test @.060" mbt/abt rating | N/A | 1/1 V-O | 1/1 V-O | 1/1 V-O | 1/1 V-O | 1/1 V-O |
| UL-94 5V flame test @.125" bars | N/A | 5-V | 5-V | 5-V | 5-V | 5-V |
| @.125 plaques |  | 5VA | 5VA | 5VA | 5VA |  |

I claim:

1. A thermoplastic resin composition, comprising:
   (a) a graft copolymer selected from the group consisting of acrylonitrile-butadiene-styrene graft copolymers, acrylonitrile-styrene-butyl acrylate graft copolymers, methyl methacrylate-butadiene-styrene graft copolymers and acrylonitrile-ethylene-propylene-nonconjugated diene-styrene graft copolymers present at a level of from 60 to 99.8 percent by weight based on the total weight of said composition;
   (b) a metal salt of a fatty acid or an ester of a fatty acid present at a level of from 0.1 to 0.9 percent by weight based on the total weight of the composition, and
   (c) a tetrafluoroethylene polymer having a fluorine content of from 65 to 75 percent percent by weight, based on the weight of the a terafluoroethylene polymer, present at a level of from 0.03 to 0.8 percent by weight based on the total weight of the composition, said tetrafluoroethylene polymer being introduced into said composition in the form of a preblend comprising from 0.5 to 50 percent by weight, based on the total weight of the preblend, of said tetrafluoroethylene polymer and from 50 to 95.5 percent by weight based on the total weight of the preblend, of a vinyl aromatic polymer.

2. The composition of claim 1 wherein said metal salt of a fatty acid is present at a level of from 0.4 to 0.6 percent by weight based on the total weight of the composition.

3. The composition of claim 1 wherein said tetrafluoroethylene polymer is present at a level of from 0.04 to 0.5 percent by weight based on the total weight of the composition.

4. The composition of claim 1 wherein said tetrafluoroethylene polymer is present at a level of from 0.05 to 0.2 percent by weight based on the total weight of the composition.

5. The composition of claim 1 wherein said preblend comprises said tetrafluoroethylene polymer at a level of from 7 to 25 percent by weight based on the total weight of the composition.

6. The composition of claim 1 wherein said composition is free of flame retardants selected from the group consisting of brominated materials, chlorinated materials and phosphates.

7. The composition of claim 1 wherein the graft copolymer is an acrylonitrile-butadiene-styrene graft copolymer.

8. The composition of claim 1, further comprising a nongrafted thermoplastic resin.

9. The composition of claim 8, wherein the nongrafted thermoplastic resin is derived from a monomer selected from the group consisting of styrene, alpha-methylstyrene, para-methylstyrene, methyl acrylate, methyl methacrylate acrylonitrile methacrylonitrile, maleic acid anhydride, vinyl acetate and mixtures thereof.

10. The composition of claim 9, wherein the non-grafted thermoplastic resin is a styrene-acrylonitrile resin.

11. The composition of claim 1, wherein the vinyl aromatic polymer of the preblend is a styrene-acrylonitrile resin.

12. The composition of claim 1, wherein component (b) is a magnesium or calcium salt of a fatty acid.

13. The composition of claim 12, wherein component (b) is magnesium stearate.

14. The composition of claim 1, wherein component (b) is a stearic acid ester.

15. The composition of claim 6, wherein component (b) is pentaerythritol tetrastearate.

16. The composition of claim 1, wherein the graft copolymer is an acrylonitrile-butadiene-styrene graft copolymer, component (b) is magnesium stearate, the tetrafluoroethylene polymer is polytetrafluoroethylene and the vinyl aromatic polymer of the preblend is a styrene-acrylonitrile resin.

* * * * *